US008568570B2

(12) United States Patent
Chang et al.

(10) Patent No.: US 8,568,570 B2
(45) Date of Patent: Oct. 29, 2013

(54) USE OF METHOD FOR ONE STEP SYNTHESIZING AND IMMOBILIZING CRYSTALLINE TIO₂ NANO-PARTICLES SIMULTANEOUSLY ON POLYMER MATERIAL

(71) Applicant: Industrial Technology Research Institute, Hsinchu (TW)

(72) Inventors: Min-Chao Chang, Hsinchu (TW); Hsin Shao, Hsinchu County (TW); Meng-Shun Huang, New Taipei (TW); Li-Ching Chung, Changhua County (TW); Po-I Liu, Kaohsiung (TW); Arnold Chang-Mou Yang, Hsinchu County (TW); Yen-Hui Liu, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 13/676,975

(22) Filed: Nov. 14, 2012

(65) Prior Publication Data

US 2013/0068610 A1 Mar. 21, 2013

Related U.S. Application Data

(62) Division of application No. 12/661,508, filed on Mar. 17, 2010, now Pat. No. 8,349,141.

(30) Foreign Application Priority Data

Oct. 19, 2009 (TW) .............................. 98135277 A

(51) Int. Cl.
| A62D 3/178 | (2007.01) |
| C01D 1/02 | (2006.01) |
| H05B 6/64 | (2006.01) |
| B29C 35/08 | (2006.01) |
| B05D 3/06 | (2006.01) |
| C08J 7/18 | (2006.01) |

(52) U.S. Cl.
USPC ................. 204/157.43; 204/157.51; 427/285; 427/553; 427/557; 427/389.9; 264/489; 264/490; 264/494; 264/496

(58) Field of Classification Search
USPC .......... 264/489, 490, 494, 496; 427/285, 553, 427/557, 389.9; 204/157.43, 157.51
See application file for complete search history.

(56) References Cited

U.S. PATENT DOCUMENTS

| 7,247,350 B2 * | 7/2007 | Sepeur et al. ................. 427/387 |
| 2004/0046086 A1 * | 3/2004 | Dixon et al. ................. 244/199 |

* cited by examiner

Primary Examiner — Keith Hendricks
Assistant Examiner — Colleen M Raphael
(74) Attorney, Agent, or Firm — J.C. Patents

(57) ABSTRACT

A method of fabricating a sheet or a fabric with crystalline TiO₂ nano-particles includes providing a polymer material as a support, and then synthesizing the crystalline TiO₂ nano-particles with immobilizing them on a surface of the support, followed by forming the fabric or the sheet. The fabric is a textile or a nonwoven fabric. A type of the support is a fiber or a sheet type. The synthesizing of the crystalline TiO₂ nano-particles is performed by occurring a sol-gel reaction under a microwave irradiation, wherein a TiO₂ precursor, water, an alcohol, and an ionic liquid applied in the sol-gel reaction during the synthesizing.

19 Claims, 8 Drawing Sheets

1

USE OF METHOD FOR ONE STEP SYNTHESIZING AND IMMOBILIZING CRYSTALLINE TIO₂ NANO-PARTICLES SIMULTANEOUSLY ON POLYMER MATERIAL

CROSS-REFERENCE TO RELATED APPLICATION

This application is a divisional application of and claims priority benefit of an U.S. application Ser. No. 12/661,508, filed on Mar. 17, 2010, now pending, which claims the priority benefit of Taiwan application serial no. 98135277, filed on Oct. 19, 2009. The entirety of each of the above-mentioned patent applications is hereby incorporated by reference herein and made a part of specification.

BACKGROUND OF THE INVENTION

1. Field of the Invention

The invention relates to a method of fabricating a sheet or a fabric with crystalline titanium dioxide ($TiO_2$) nano-particles.

2. Description of Related Art

Crystalline titanium dioxide nano-particle is frequent used as a photocatalyst due to its superior oxidation-reduction ability and high chemical stability. Crystalline titanium dioxide nano-particle can be synthesized by various methods and one of methods is sol gel method. The usage of ionic liquid (IL) in sol gel method for synthesizing crystalline titanium dioxide nano-particle under ambient condition was first published in J. AM. CHEM. SOC. 2003, 125, 14960-14961, 2003. Owing to the self-organizing ability of ion liquid, anatase crystalline $TiO_2$ nano-particle, which has large surface area, can be obtained by this method ("$TiO_2$ particles" and "crystalline $TiO_2$ nano-particles" both refer to the anatase crystalline $TiO_2$ nano-particles thereinafter). Combining with the high microwave (MW) absorbing ability of ionic liquid, IL/MW method is recognized as a green synthetic method for synthesizing inorganic nano-material. The two principal benefits of this method are high reaction rate and short reaction time.

In photocatalytic water treatment application, crystalline $TiO_2$ nano-particles, mainly anatase type, are directly dispersed in an aqueous phase or immobilized on different supports such as ceramic tile, glass, polymer material, stainless steel plate, aluminum sheets, and so on. In conventional immobilization process, because of high calcination temperature requirement of forming crystalline $TiO_2$ nano-particles, above 400° C., high temperature-resistant materials, such as glass, steel, and the like, are generally used. However this is a costly process and thus the commercial application has met its bottleneck. Hence, the usage of low cost polymer material as the immobilization support is currently an active research topic in recent year.

Polymer material is thermal sensitive material. The immobilization of crystalline $TiO_2$ nano-particles on the polymer material is generally by two step process. For example, $TiO_2$ sol is firstly synthesized and then coated on the polymer materials by dip coating method. Alternatively, an embedding process can also be applied, where crystalline $TiO_2$ nano-particles are embedded into melted polymer materials such as polyethylene by hot press at suitable condition. However, the crystalline $TiO_2$ nano-particles are easily aggregated and difficult to be homogeneously dispersed in these methods and then the immobilization adhesion strength is poor and the crystalline $TiO_2$ nano-particles peel off easily.

SUMMARY OF THE INVENTION

The disclosure is directed to a method of fabricating a sheet or a fabric with a plurality of crystalline $TiO_2$ nano-particles, wherein the fabric comprises a textile or a nonwoven fabric. In the method, a polymer material is provided as a support, wherein a type of the support is a fiber or a sheet type. The crystalline $TiO_2$ nano-particles are synthesized simultaneously with immobilizing the crystalline $TiO_2$ nano-particles on a surface of the polymer material by occurring a sol-gel reaction on the surface under a microwave irradiation, wherein a $TiO_2$ precursor, water, an alcohol, and an ionic liquid applied in the sol-gel reaction during the synthesizing. After the synthesizing, the sheet or the fabric is formed by using the support after the synthesizing.

In light of the foregoing, in the disclosure, the ionic liquid is used in the sol-gel process under the microwave irradiation with one step process. Then the crystalline $TiO_2$ nano-particles are produced in-situ and directly immobilized on the surface of the fabric or the sheet. Moreover, the immobilization adhesion strength of the crystalline $TiO_2$ nano-particles on the surface of the polymer material by this disclosure is high.

In order to make the aforementioned and other features and advantages of the disclosure more comprehensible, embodiments accompanying figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF EMBODIMENTS

Figure 1:
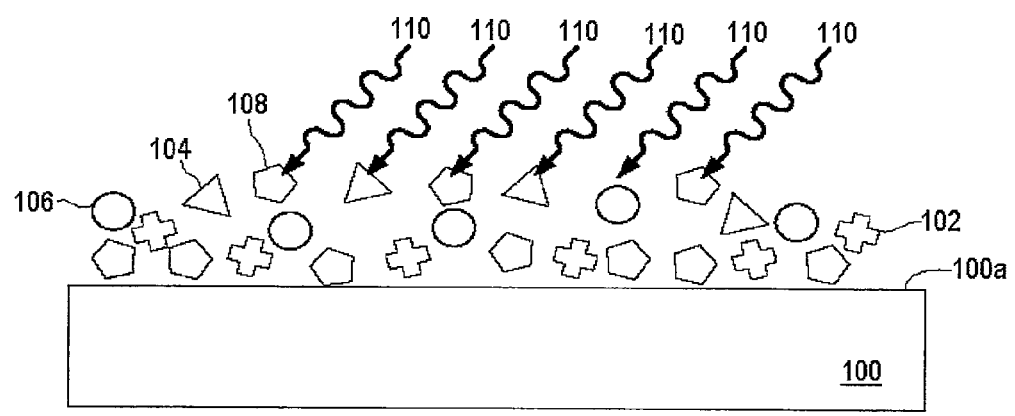
FIG. 1 is a schematic diagram a method of one step synthesizing and immobilizing crystalline $TiO_2$ nano-particles simultaneously on the polymer material according to an embodiment of the disclosure.

The following embodiments and the attached figures are merely used to describe the applications of the disclosure in detail. Nevertheless, the disclosure may also be embodied in different forms and should not be limited to the embodiments set forth hereinafter. For clarity, the sizes and relative sizes of each of the elements in the drawings may be illustrated in exaggerated proportions.

FIG. 1 is a schematic diagram of one step synthesizing and immobilizing crystalline $TiO_2$ nano-particles simultaneously on the polymer material according to an embodiment of the disclosure. In the present embodiment, a material of the polymer support 100, for example, is a thermoplastic polymer material such as polymethyl methacrylate (PMMA), polycarbonate (PC), polyester, polyamide, and the like. In addition, although the polymer support 100 has a shape of a plate, the disclosure is not limited thereto. Any materials made of polymer can utilize as the polymer support 100 in the method of the disclosure to immobilize the crystalline $TiO_2$ nano-particles on the surface thereof in one step regardless of its shape (i.e., a shape of a slab, a plate, a sheet, or a fiber).

In FIG. 1, a sol-gel reaction is occurred to form the crystalline $TiO_2$ nano-particles on the surface of the polymer support 100. The ingredients used in the sol-gel reaction, include $TiO_2$ precursor 102, water 104, an alcohol 106, and an ionic liquid 108 under a microwave irradiation 110. The ionic liquid 108 is, for instance, a conventional ionic liquid (IL) or a deep eutectic mixture solvent type ionic liquid. In this embodiment, the frequency of the microwave irradiation is ranged from 0.3 GHz to 300 GHz, and the reaction site temperature under the microwave irradiation is ranged from 40° C. to 200° C., for example.

In one embodiment, the ionic liquid 108 is the conventional ionic liquid, for example. Moreover, a cation thereof includes, for example, 1-alkyl-3-methylimidazolium, $[C_nMIM]^+$, where n represents a number of linear alkyl carbons, N-alkylpyridinium, $[C_nPY]^+$, where n represents a number of linear alkyl carbons, tetraalkylammonium, or tetraalkylphosphonium. Additionally, an anion thereof includes, for example, hexafluorophosphate ($PF_6^-$), tetrafluoroborate ($BF_4^-$), trifluoromethylsulfonate ($CF_3SO_3^-$), (bis[(trifluoromethyl)sulfonyl]amide, $[(CF_3SO_2)_2N]^-$, trifluoroethanoate ($CF_3CO_2^-$), ethanoate ($CH_3CO_2^-$), or a halide such as $Br^-$, $Cl^-$, or $I^-$. The anion combines with different organic or inorganic cations to form an ionic liquid with a large molecular weight.

In another embodiment, the ionic liquid 108 is the deep eutectic mixture solvent type ionic liquid such as an eutectic mixture having a low melting point and formed by quaternary ammonium salt and hydrogen donors. For example, the eutectic mixture having the low melting point is formed by mixing an oxalic acid and a choline cholide.

The $TiO_2$ precursor 102 used in the sol-gel process is, for instance, titanium alkoxide, or a titanium compound capable of undergoing hydrolysis and condensation reaction with water. For example, the titanium alkoxide is titanium ethoxide ($Ti(OC_2H_5)_4$) or titanium isopropoxide ($Ti(OCH(CH_3)_2)_4$). The alcohol 106 used in the sol-gel process includes an alcohol having a carbon number of 1-10; a primary alcohol (1°), a secondary alcohol (2°), or a tertiary alcohol (3°), such as ethanol, isopropyl alcohol, or tert-butyl alcohol; or diols or triols, such as ethylene glycol or glycerol. A molar ratio of the compounds used in the sol-gel process is, for example: $TiO_2$ precursor:water:alcohol:ionic liquid=0.5-20:0.5-200:0.5-100:0.5-200.

Figure 2:
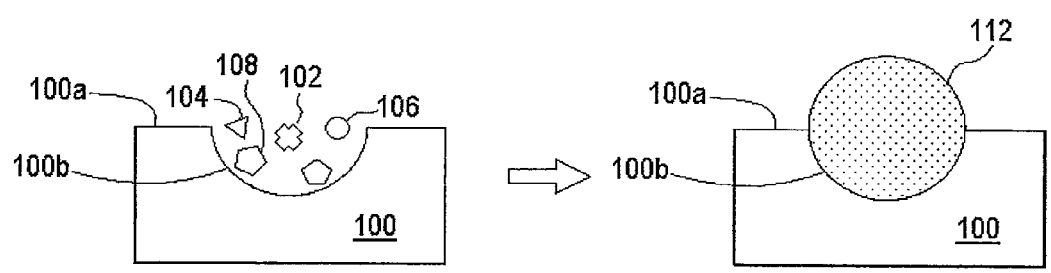
FIG. 2 is a magnified view of a partial area in FIG. 1.

FIG. 2 is a magnified view of a partial area of FIG. 1. As shown in FIG. 2, when components, such as the compounds applied in the sol-gel reaction under microwave irradiation, contact the polymer support 100, a surface 100a thereof becomes rough, and then crystalline $TiO_2$ nano-particles 112 are immobilized directly on a plurality of cavities 100b. At this time, a superior surface adhesion is found between the crystalline $TiO_2$ nano-particles 112 and the polymer support 100. The superior adhesion strength still retains after 30 minutes of ultra-sonic treatment.

In the method of the aforementioned embodiment, the microwave irradiation is adopted. Since conventional polymer materials do not absorb microwave, the entire system is only microwave heated at reaction sites containing polar materials such as water, ionic liquid or alcohol. Therefore, the surrounding temperature of the reaction system can be controlled under 150° C., accordingly, the crystalline anatase $TiO_2$ nano-particles are synthesized and immobilized on the surface of the support made of polymer material by one step without affecting the physical and mechanical properties of the polymer material. Hence, the method in the embodiment mentioned above is suitable to be applied in immobilization of crystalline anatase $TiO_2$ nano-particle (i.e. photocatalyst products) using the polymer materials as the support. The foregoing polymer materials are the materials of the polymer support 100 in the embodiment aforementioned. As long as the material itself is made of a polymer, the crystalline anatase $TiO_2$ nano-particles can be synthesized on the surface of the polymer material using the methods aforementioned regardless of the shape being a slab, a plate, a sheet, or a fiber. For instance, when the polymer material is a fiber type, the crystalline anatase $TiO_2$ nano-particles can be directly synthesized and immobilized thereon with the method of the disclosure by one step. Obviously, this method can be applied to non-woven fabrics and the like.

The following exemplifies a plurality of experiments to demonstrate efficacy of the disclosure.

Experiment 1

Figure 3:
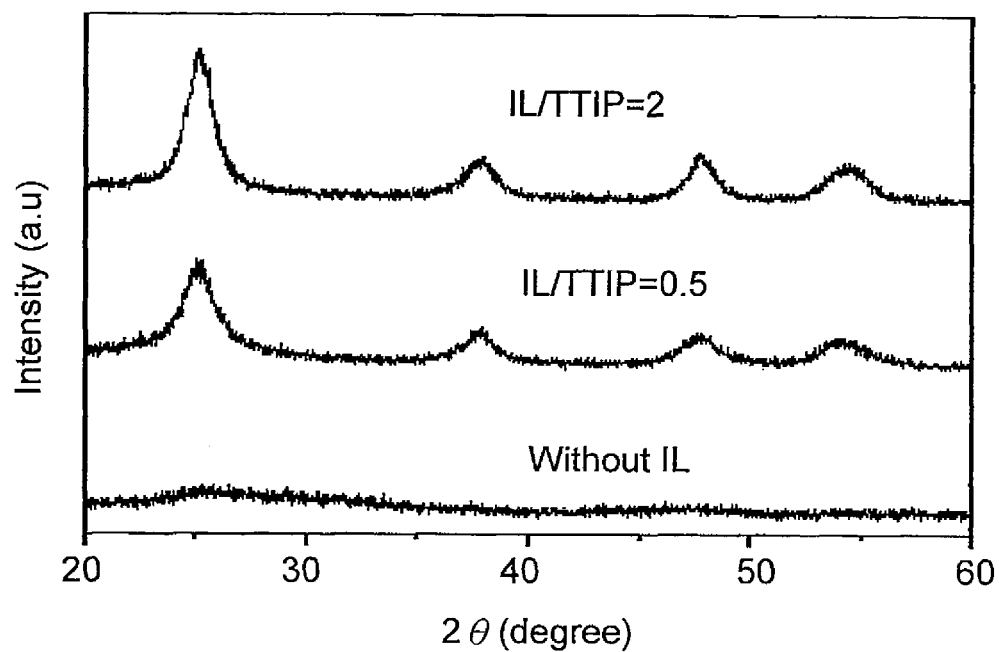
FIG. 3 is an X-ray diffraction (XRD) diagram of Experiment 1 in the disclosure.

In this experiment, the ingredients include the following: titanium tetraisopropoxide, (TTIP, manufactured by E. Merck) as the $TiO_2$ precursor, isopropyl alcohol (IPA, manufactured by E. Merck) as the alcohol, deionized water, and 1-butyl-3-methylimidazolium tetrafluoroborate, $[Bmim]^+$ $[BF_4]^-$, (manufactured by E. Merck), as the ionic liquid (IL). With a molar ratio of the ingredients being $TTIP:IPA:H_2O=1:3:5$, the amount of the IL added is changed, where the molar ratio of IL/TTIP is 0, 0.5, and 2 respectively. The deionized water is then added to the reaction mixture. Afterwards, the mixture is further stirred for 10 minutes at room temperature and then microwave irradiated for 20 minutes, where the microwave power is 800 W and the frequency thereof is 2.45 GHz. The dried product of $TiO_2$ after filtration is examined with X-ray diffraction (XRD) and FIG. 3 is obtained therefrom. As shown in FIG. 3, the crystalline anatase $TiO_2$ nano-particles are formed and the anatase crystallinity increased with the increasing of IL.

Experiment 2

Figure 4A:
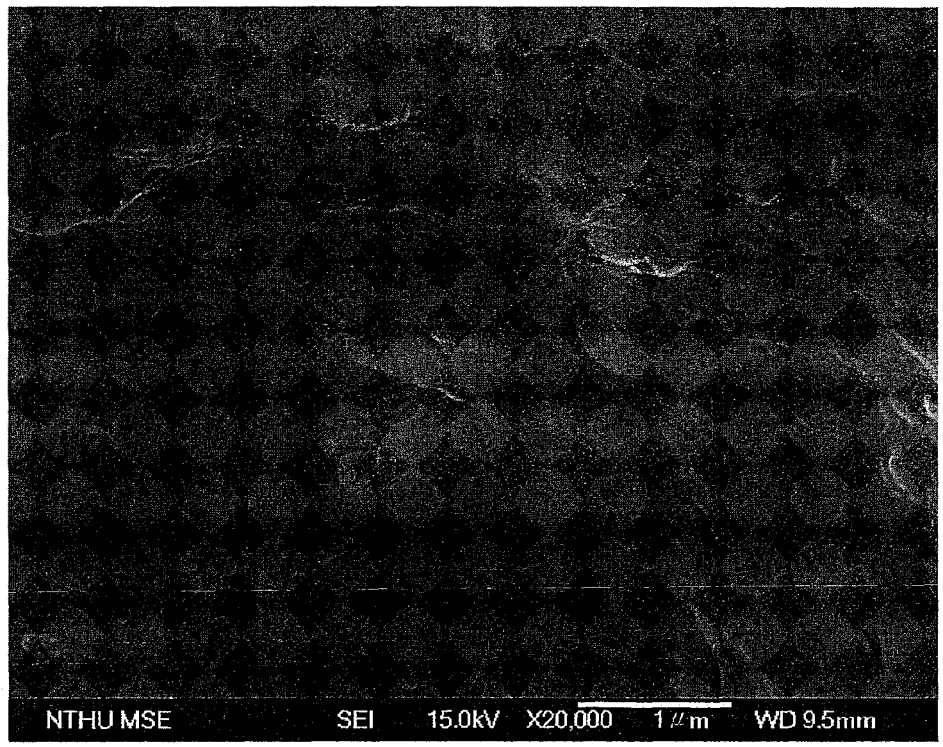
FIG. 4A is a scanning electron microscope (SEM) photograph of a sheet of PMMA material in the presence of IPA under microwave irradiation.
Figure 4B:
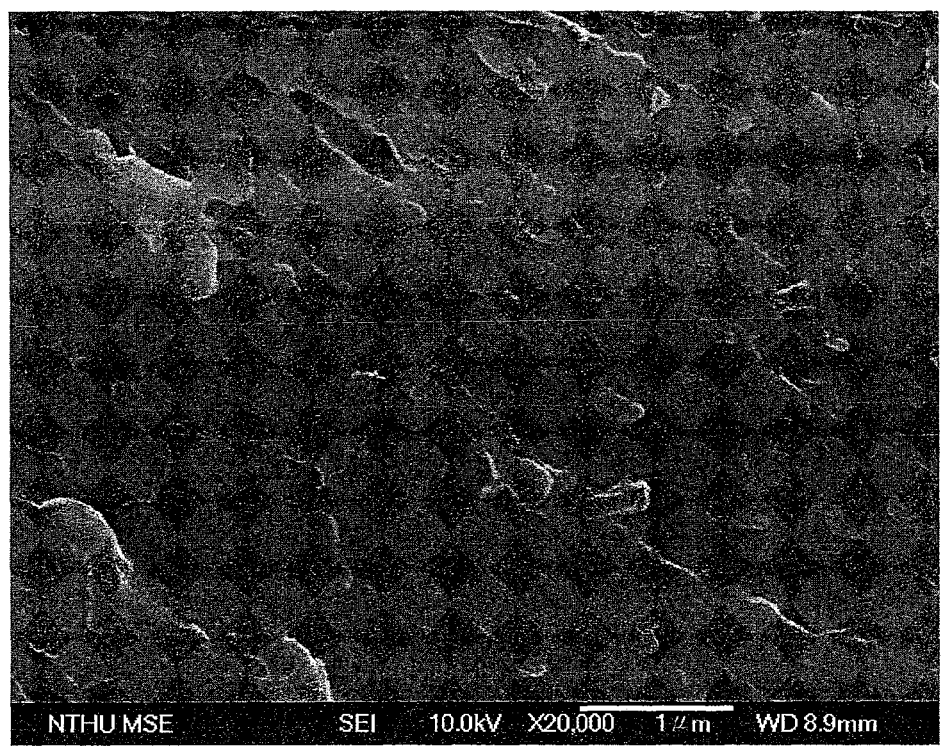
FIG. 4B is a SEM photograph of PMMA in the presence of IL under microwave irradiation.

FIG. 4A is a scanning electron microscope (SEM) photograph of a PMMA sheet treated with IPA for 3 minutes under microwave irradiation. An SEM photograph of FIG. 4B is the PMMA sheet treated with IL (IL is $[Bmim]^+[BF_4]^-$) for 30 minutes under microwave irradiation. As illustrated in FIG. 4A and FIG. 4B, IPA and IL both roughens the surface of PMMA.

Experiment 3

In this experiment, the PMMA sheet (i.e. with a size of, for example, 20 mm×10 mm×2 mm) or the sheet-shaped PMMA (i.e. a cylinder with a diameter of 4 mm and a height of 3 mm) is first placed within a reaction vessel. The IL is [Bmim]$^+$[BF$_4$]$^-$, where the molar ratio of TIPP:IPA:IL:H$_2$O=1:3:1:100. The deionized water is added to the reaction mixture of TTIP, IPA, and IL at a rate of 20 mL/min and then the mixture is microwave irradiated directly for 30 minutes.

Figure 5:
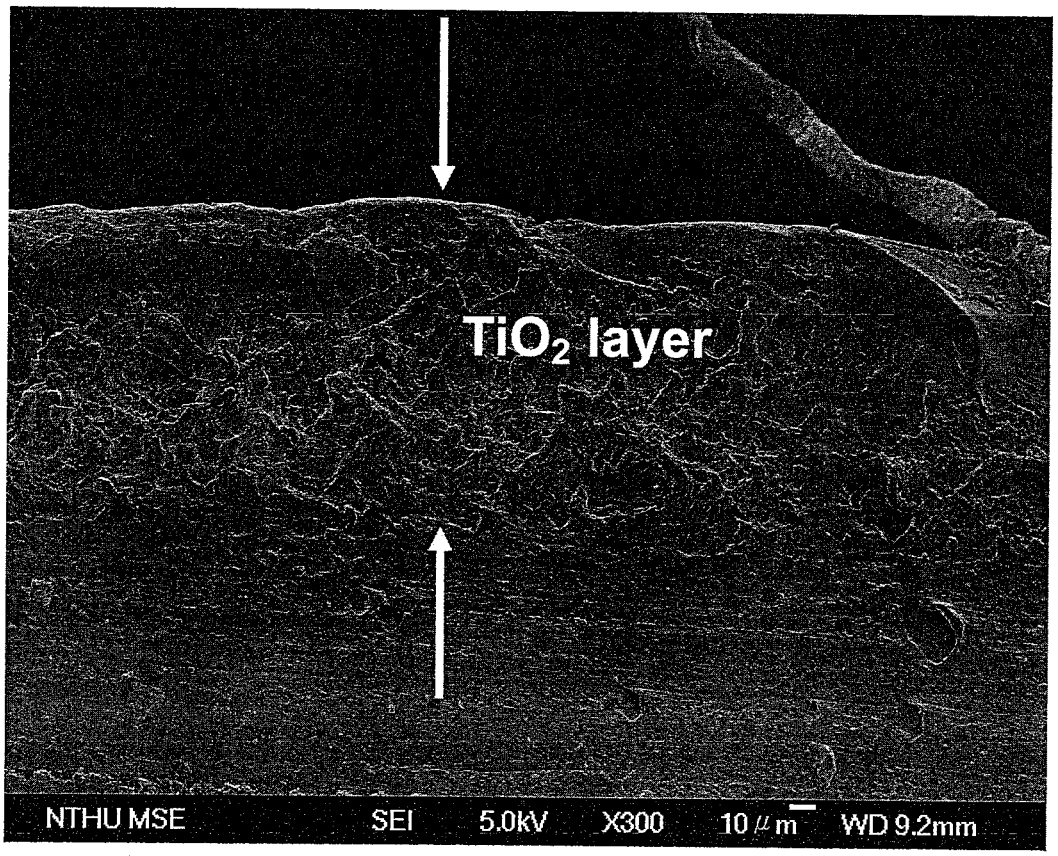
FIG. 5 is a SEM photograph of a cross-section of the PMMA material with the immobilized titanium dioxide ($TiO_2$) obtained from Experiment 3.

The final PMMA sheet is shown in FIG. 5, which illustrates a SEM photograph of a cross-section of crystalline TiO$_2$ immobilized on the surface of the PMMA support obtained from Experiment 3.

Experiment 4

In this experiment, the PMMA sheet (i.e. 20 mm×10 mm×2 mm) is first placed within a reaction vessel. Further, the ingredients in Experiment 1 are used to perform under microwave irradiation by adjusting different ratios of ingredient. The photocatalytic efficiency of the immobilized TiO$_2$ is examined.

Figure 6:
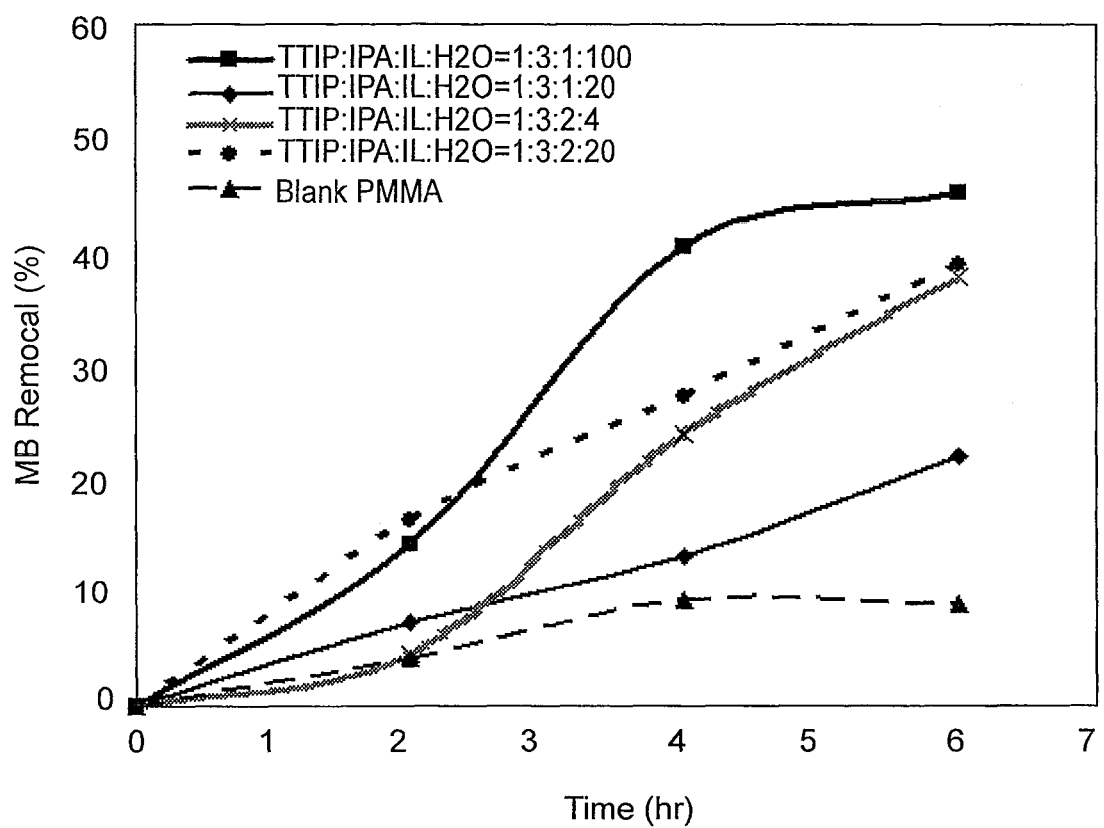
FIG. 6 illustrates the figure of photocatalytic efficiencies of the crystalline $TiO_2$ nano-particles synthesized by this disclosure under different ratios of reagents.

In the photocatalytic efficiency test, 300 ml of aqueous solution with 5 ppm methylene blue (MB) is first prepared. Several immobilized TiO$_2$ samples are added. Thereafter, the UV light is applied, the wavelength of UV is 365 nm and light intensity is 13 W. The irradiation time is 6 hours. A sample for analysis is aliquot every 2 hours and the results are shown in FIG. 6. From the results of FIG. 6, it can be seen that the immobilized TiO$_2$ sample prepared with the method of the disclosure does have significant photocatalytic performance.

Experiment 5

In this experiment, the slab type chip PMMA (a cylinder with a diameter of 4 mm and a height of 3 mm), the same method as that performed in Experiment 4 is carried out.

The photocatalytic efficiency experiment includes the following. Here, 300 ml of aqueous solution with 5 ppm methylene blue (MB) is first prepared. Several PMMA samples have been placed therein, raw water. The light source is the same as that of Experiment 4. The irradiation time is 6 hours. A sample for analysis is aliquot every 2 hours and the results are shown in FIG. 7.

Figure 7:
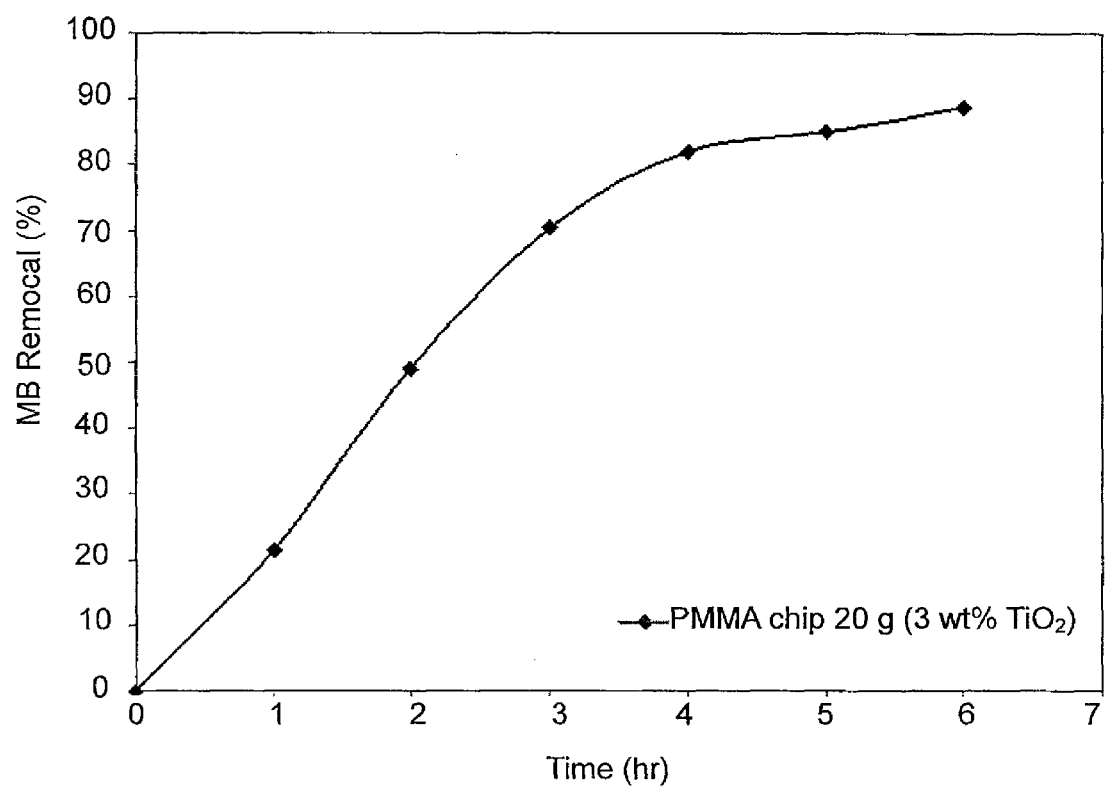
FIG. 7 is the figure of photocatalytic efficiencies of immobilized $TiO_2$ using the slab type PMMA.

From the results of FIG. 7, it can be seen that immobilized TiO$_2$ sample prepares in this experiment does have significant photocatalytic performance.

Experiment 6

In this experiment, the sheet-shaped PE-PVAc, and PVAE are respectively placed in the reaction vessel. The reagents with a molar ratio of TIPP:IPA:IL:H$_2$O=1:3:1:100. IPA:IL:H$_2$O=1:3:1:100. With the same photocatalytic performance test method in Experiment 3, the photocatalyst efficiency of crystalline TiO$_2$ immobilized on different polymer support is examined, and the results are shown in FIG. 8.

Figure 8:
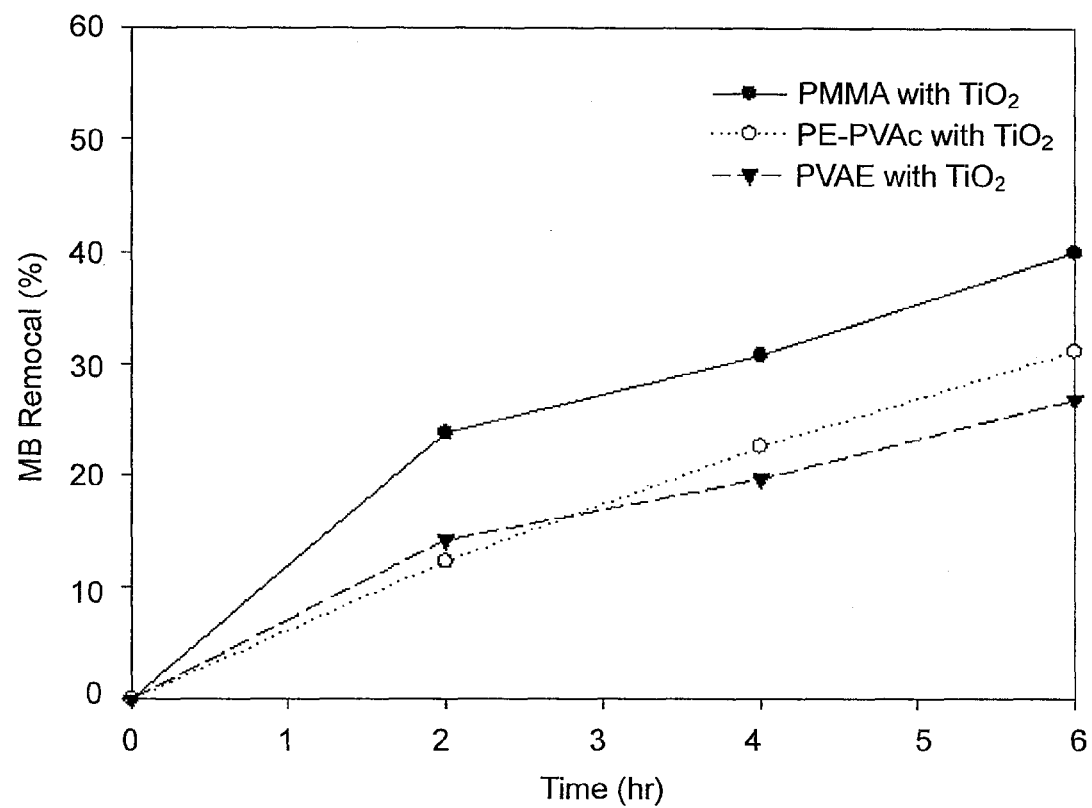
FIG. 8 is the figure of photocatalytic efficiencies of $TiO_2$ immobilized on different polymer materials.

As the results are illustrated in FIG. 8, it can be seen that crystalline TiO$_2$ nanoparticle synthesized with the method of the disclosure can be immobilized on the surface of PMMA, PE-PVAc, or PVAE. The immobilized TiO$_2$ retains the photocatalytic effect.

Experiment 7

Figure 9:
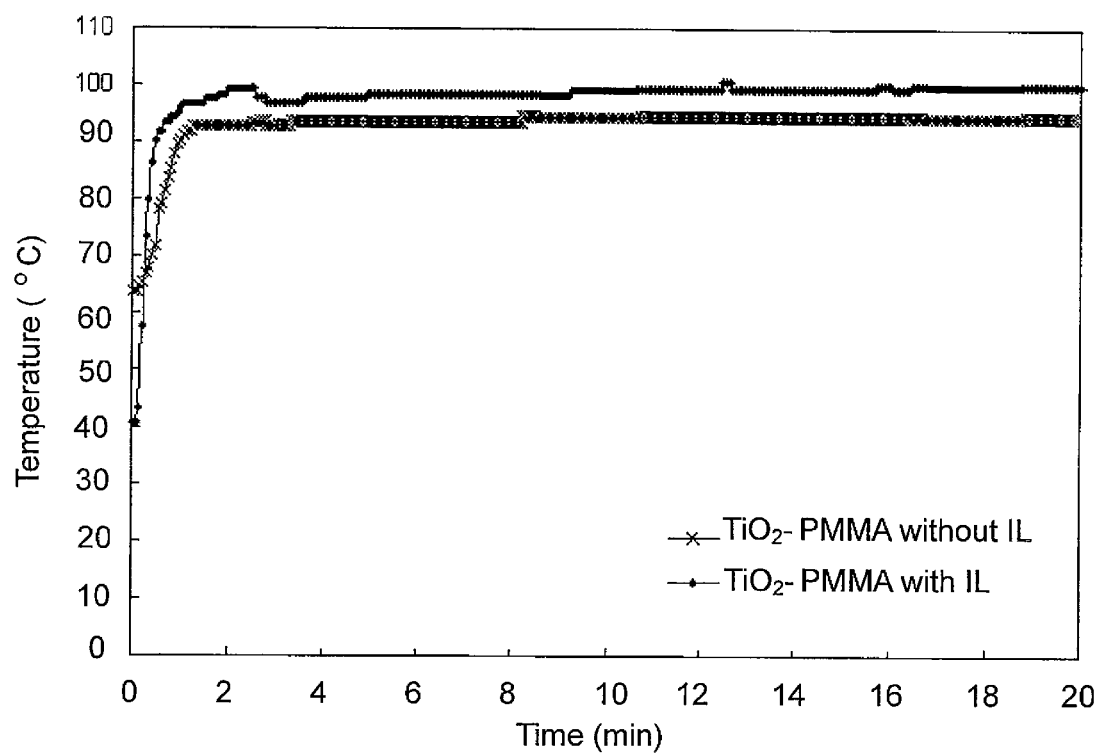
FIG. 9 is the temperature profiles of the reaction in Experiment 3 of the disclosure.

All the steps performed in Experiment 7 are identical to those implemented in Experiment 3 besides the addition of IL. The temperature profiles reveal that the temperature of the reaction system is under 100° C., as shown in FIG. 9. However, the reaction temperature slightly increases when IL is added.

In summarizing the illustrations and experiments above-mentioned, in the disclosure, the ionic liquid and microwave irradiation are used simultaneously in this one step method. Therefore, the crystalline anatase TiO$_2$ nano-particles are in-situ synthesized and immobilized on the surface of the polymer support. The disclosure achieves the synthesis and immobilization simultaneously by one step process, thus is much more time saving and energy saving than the conventional two steps immobilization method. In addition, the IL can be recycled, so the disclosure is a green technology.

Although the disclosure has been described with reference to the above embodiments, it will be apparent to one of the ordinary skill in the art that modifications to the described embodiment may be made without departing from the spirit of the disclosure. Accordingly, the scope of the disclosure will be defined by the attached claims not by the above detailed descriptions.

What is claimed is:

1. A method of fabricating a sheet or a fabric with a plurality of crystalline TiO$_2$ nano-particles, wherein the fabric comprises a textile or a nonwoven fabric, comprising:
   providing a polymer material as a support, wherein a type of the support is a fiber or a sheet type; and
   synthesizing the plurality of crystalline TiO$_2$ nano-particles simultaneously with immobilizing the crystalline TiO$_2$ nano-particles on a surface of the polymer material by occurring a sol-gel reaction on the surface under a microwave irradiation, wherein a TiO$_2$ precursor, water, an alcohol, and an ionic liquid are applied in the sol-gel reaction during the synthesizing; and
   forming the sheet or the fabric by using the support after the synthesizing.

2. The method as claimed in claim 1, wherein the polymer material comprises a thermoplastic polymer material.

3. The method as claimed in claim 2, wherein the polymer material comprises polymethyl methacrylate, polycarbonate, polyester, or polyamide.

4. The method as claimed in claim 1, wherein the ionic liquid comprises a conventional ionic liquid or a deep eutectic mixture solvent type ionic liquid.

5. The method as claimed in claim 4, wherein a cation of the conventional ionic liquid comprises 1-alkyl-3-methylimidazolium, [C$_n$MIM]$^+$, wherein n represents a number of linear alkyl carbons, N-alkylpyridinium, [C$_n$PY]$^+$, wherein n represents a number of linear alkyl carbons, tetraalkylammonium, or tetraalkylphosphonium.

6. The method as claimed in claim 4, wherein an anion of the conventional ionic liquid comprises hexafluorophosphate, tetrafluoroborate, trifluoromethylsulfonate, (bis[(trifluoromethyl)sulfonyl]amide, trifluoroethanoate, ethanoate, or a halide.

7. The method as claimed in claim 6, wherein the halide comprises Br$^-$, Cl$^-$, or I$^-$.

8. The method as claimed in claim 4, wherein the deep eutectic mixture solvent type ionic liquid comprises an eutectic mixture having a low melting point being formed by quaternary ammonium salt and hydrogen donors.

9. The method as claimed in claim 8, wherein the deep eutectic mixture solvent type ionic liquid having the low melting point is formed by an oxalic acid and a cholide.

10. The method as claimed in claim 1, wherein the TiO$_2$ precursor comprises titanium alkoxide or a titanium compound capable of undergoing hydrolysis and condensation reaction with water.

11. The method as claimed in claim 10, wherein the titanium alkoxide comprises titanium ethoxide or titanium isopropoxide.

12. The method as claimed in claim 1, wherein the alcohol comprises an alcohol having a carbon number of 1-10.

13. The method as claimed in claim 1, wherein the alcohol comprises a primary alcohol, a secondary alcohol, or a tertiary alcohol.

14. The method as claimed in claim 13, wherein the alcohol comprises ethanol, isopropyl alcohol, or tert-butyl alcohol.

15. The method as claimed in claim 1, wherein the alcohol comprises diols or triols.

16. The method as claimed in claim 15, wherein the alcohol comprises ethylene glycol or glycerol.

17. The method as claimed in claim 1, wherein a molar ratio of compounds used in the reaction is: $TiO_2$:water:alcohol:ionic liquid=0.5-20:0.5-200:0.5-100:0.5-200.

18. The method as claimed in claim 1, wherein the frequency of the microwave irradiation ranges from 0.3 GHz to 300 GHz.

19. The method as claimed in claim 1, wherein the reaction temperature under the microwave irradiation ranges from 40° C. to 200° C.

\* \* \* \* \*